United States Patent
Luo et al.

(10) Patent No.: US 10,908,798 B2
(45) Date of Patent: Feb. 2, 2021

(54) DISPLAY CONTROL METHOD AND APPARATUS FOR DISPLAY INTERFACE OF MOBILE TERMINAL

(71) Applicant: BEIJING BYTEDANCE NETWORK TECHNOLOGY CO LTD., Beijing (CN)

(72) Inventors: Yonghao Luo, Beijing (CN); Zuohui Tian, Beijing (CN)

(73) Assignee: BEIJING BYTEDANCE NETWORK TECHNOLOGY CO LTD, Beijing (CN)

( * ) Notice: Subject to any disclaimer, the term of this patent is extended or adjusted under 35 U.S.C. 154(b) by 1136 days.

(21) Appl. No.: 14/904,576

(22) PCT Filed: Apr. 25, 2014

(86) PCT No.: PCT/CN2014/076188
§ 371 (c)(1),
(2) Date: Jan. 12, 2016

(87) PCT Pub. No.: WO2015/007112
PCT Pub. Date: Jan. 22, 2015

(65) Prior Publication Data
US 2016/0154578 A1    Jun. 2, 2016

(30) Foreign Application Priority Data

Jul. 16, 2013 (CN) .......................... 2013 1 0298277

(51) Int. Cl.
*G06F 3/0484* (2013.01)
*G06F 3/01* (2006.01)

(52) U.S. Cl.
CPC ............ *G06F 3/04847* (2013.01); *G06F 3/01* (2013.01)

(58) Field of Classification Search
CPC .... G06F 3/0481; G06F 3/0482; G06F 3/0483; G06F 9/4443; G06F 3/04847; G06F 3/01; G09G 5/14; H04N 5/44591
See application file for complete search history.

(56) References Cited

U.S. PATENT DOCUMENTS 4,687,977 A * 8/1987 Brahmavar .............. H02K 3/16
310/68 C
5,481,741 A * 1/1996 McKaskle ............ G06F 3/0481
345/522

(Continued)

FOREIGN PATENT DOCUMENTS

CN        201289641 Y      8/2009
CN        202696710 U      1/2013

(Continued)

OTHER PUBLICATIONS

Sony Xperia tipo Review, Daniel P., Sep. 4, 2012, pp. 21 (Year: 2012).*

(Continued)

*Primary Examiner* — Arpan P. Savla
*Assistant Examiner* — Erik V Stitt
(74) *Attorney, Agent, or Firm* — Mauriel Kapouytian Woods LLP; Lana Akopyan; Michael Mauriel

(57) ABSTRACT

A method and apparatus for controlling display of an interface in a mobile terminal are provided. The mobile terminal is communicatively connected to an external device. The method comprises: acquiring a pattern and/or a colour of the external device; and according to the pattern and/or the colour and the style categories of the display interface pre-stored in the mobile terminal, adjusting the current display style of the display interface, so as to enable the display style to match the pattern and/or the colour of the external device. In the display control method, the mobile terminal can adjust the display style of the display interface (Continued)

thereof according to the acquired pattern and/or colour of the external device, so as to enable the display style to match the pattern and/or the colour of the external device.

8 Claims, 3 Drawing Sheets

(56) References Cited

U.S. PATENT DOCUMENTS

| | | | | |
|---|---|---|---|---|
| 6,152,597 | A * | 11/2000 | Potega | G01K 1/02 374/185 |
| 6,215,274 | B1 * | 4/2001 | Dotzler | H01M 6/5066 320/106 |
| 6,310,590 | B1 * | 10/2001 | Havel | G01R 13/26 324/115 |
| 6,515,484 | B1 * | 2/2003 | Bald | G01R 31/1227 324/551 |
| 6,920,606 | B1 * | 7/2005 | Jablonski | G06Q 30/02 345/619 |
| 7,426,695 | B1 * | 9/2008 | Massaro | G06F 1/181 715/745 |
| 7,489,102 | B2 * | 2/2009 | Purdy | H02J 7/0052 320/106 |
| 7,908,414 | B2 * | 3/2011 | Combs | G06F 1/266 710/10 |
| 9,078,115 | B2 * | 7/2015 | Shmunis | H04M 1/04 |
| 9,201,593 | B2 * | 12/2015 | Collopy | G06F 1/1624 |
| 9,573,532 | B2 * | 2/2017 | Riddiford | F16M 11/041 |
| 2003/0036874 | A1 * | 2/2003 | Fuller, III | G06F 9/44505 702/123 |
| 2005/0062455 | A1 * | 3/2005 | Stavely | G06F 1/263 320/106 |
| 2005/0172001 | A1 * | 8/2005 | Zaner | H04L 29/06 709/205 |
| 2006/0109704 | A1 * | 5/2006 | Seo | G11C 11/5678 365/148 |
| 2007/0033254 | A1 * | 2/2007 | AlHusseini | H04L 67/38 709/205 |
| 2007/0052615 | A1 | 3/2007 | Van Dongen et al. | |
| 2009/0128126 | A1 * | 5/2009 | Garland | G01R 15/002 324/115 |
| 2011/0035708 | A1 * | 2/2011 | Damale | G06F 3/04883 715/863 |
| 2011/0119610 | A1 * | 5/2011 | Hackborn | G06F 9/451 715/768 |
| 2011/0248665 | A1 * | 10/2011 | Smith | H04M 1/04 320/101 |
| 2011/0273181 | A1 * | 11/2011 | Park | H02J 7/0008 324/429 |
| 2012/0150970 | A1 * | 6/2012 | Peterson | H04L 65/4007 709/206 |
| 2012/0315959 | A1 * | 12/2012 | Book | H02J 7/0003 455/572 |
| 2013/0169662 | A1 | 7/2013 | Yun et al. | |
| 2014/0218393 | A1 * | 8/2014 | Lee | G06T 11/001 345/619 |
| 2014/0279443 | A1 * | 9/2014 | Neeley | G01D 7/08 705/39 |
| 2016/0085384 | A1 * | 3/2016 | Selim | G06F 3/1438 715/761 |
| 2016/0134737 | A1 * | 5/2016 | Pulletikurty | G06F 3/0227 715/735 |

FOREIGN PATENT DOCUMENTS

| | | |
|---|---|---|
| CN | 103186319 A | 7/2013 |
| CN | 103187022 A | 7/2013 |
| CN | 103324293 A | 9/2013 |

OTHER PUBLICATIONS

International Searching Authority, International Search Report for Interational Application No. PCT/CN2014/076188, dated Aug. 4, 2014.

* cited by examiner

DISPLAY CONTROL METHOD AND APPARATUS FOR DISPLAY INTERFACE OF MOBILE TERMINAL

The present application is the national phase of International Application No. PCT/CN2014/076188, titled "DISPLAY CONTROL METHOD AND APPARATUS FOR DISPLAY INTERFACE OF MOBILE TERMINAL", filed on Apr. 25, 2014, which claims the priority to Chinese Patent Application No. 201310298277.2, titled "DISPLAY CONTROL METHOD AND APPARATUS FOR DISPLAY INTERFACE OF MOBILE TERMINAL" and filed with the Chinese State Intellectual Property Office on Jul. 16, 2013, both of which are incorporated herein by reference in their entirety.

FIELD

The present disclosure relates the field of communication technology, and particularly to a method and apparatus for controlling display of an interface in a mobile terminal.

BACKGROUND

With the development of science and technology, it is inevitable to connect mobile terminals to various external devices such as an external power supply. When being connected to an external device, a mobile terminal can not adapt a current style of its interface to an appearance, such as pattern and/or color, of the external device by automatically adjusting the style of the interface. The style of the interface can only be set manually by a user to be adapted to the appearance of the external device. The operation for the user to manually set the style of the interface is tedious.

SUMMARY

In view of this, a method and apparatus for controlling display of an interface in a mobile terminal are provided in the present disclosure, to automatically adjust a current interface style of the mobile terminal and avoid the tedious operation of manually setting the interface.

In order to solve the technical problems described above, the following technical solutions are provided in the disclosure.

A method for controlling display of an interface in a mobile terminal is provided, the mobile terminal is communicatively connected to an external device, the method includes:

acquiring a pattern and/or a color of the external device; and adjusting a current display style of the interface based on the pattern and/or the color and categories for the style of the interface the interface which are prestored in the mobile terminal, to be matched with the pattern and/or the color of the external device.

Furthermore, the external device is provided with a preset resistor, and a resistance of the preset resistor corresponds to the pattern and/or the color of the external device, the acquiring the pattern and/or the color of the external device comprises:

detecting the resistance of the preset resistor in the external device; and acquiring a pattern and/or a color corresponding to the pattern and/or the color of the external device based on the resistance of the preset resistor.

Furthermore, the external device stores module parameters related to the pattern and/or the color of the external device, the acquiring the pattern and/or the color of the external device comprises:

reading the module parameters related to the pattern and/or the color of the external device; and acquiring the pattern and/or the color of the external device based on the module parameters related to the pattern and/or the color of the external device.

Furthermore, the external device is an external power supply attached to a side of the mobile terminal back to the interface.

Furthermore, the communication connection between the mobile terminal and the external device includes a wireless communication connection or a wired communication connection.

Furthermore, the style of the interface includes a color of the interface and/or a format of an icon for an element within the interface.

Furthermore, the format of the icon for the element within the interface includes a color, a shape, a size, a static state and/or a dynamic state of the icon.

An apparatus for controlling display of an interface in a mobile terminal is provided, the mobile terminal is communicatively connected to an external device, the apparatus includes:

an acquiring unit configured to acquire a pattern and/or a color of the external device; and an adjusting unit configured to adjust a current display style of the interface based on the pattern and/or the color and categories for the style of the interface the interface which are prestored in the mobile terminal, to be matched with the pattern and/or the color of the external device.

Furthermore, the external device is provided with a preset resistor, and a resistance of the preset resistor corresponds to the pattern and/or the color of the external device, the acquiring unit comprises:

a detecting unit configured to detect the resistance of the preset resistor in the external device; and a first acquiring sub-unit configured to acquire a pattern and/or a color corresponding to the pattern and/or the color of the external device based on the resistance of the preset resistor.

Furthermore, the external device stores module parameters related to the pattern and/or the color, the acquiring unit comprises:

a reading unit configured to read the module parameters related to the pattern and/or the color of the external device; and a second acquiring sub-unit configured to acquire the pattern and/or the color of the external device based on the module parameters related to the pattern and/or the color of the external device.

In the method for controlling display of interface in the mobile terminal according to the present disclosure, the mobile terminal can perform data transmission with an external device after the mobile terminal is communicatively connected to the external device, and after acquire the pattern and/or the color of the external device, the mobile terminal can adjust the display style of the interface automatically based on the pattern and/or the color of the external device, to be matched with the pattern and/or the color of the external device. Therefore, with the method, an operation of manually adjusting the interface of the mobile terminal by the user is avoided, user operation is simplified, and user experience is improved.

BRIEF DESCRIPTION OF THE DRAWINGS

For clear understanding of the technical solution in the present disclosure, drawings used in the description of the embodiments will be introduced briefly in the following. Obviously, the drawings described below are merely a few embodiments of the present disclosure. For those skilled in the art, other drawings can be obtained based on these drawings without any creative work.

DETAILED DESCRIPTION OF THE EMBODIMENTS

For ease of understanding by those skilled in the art, a method and apparatus for controlling display of an interface in a mobile terminal according to the embodiments of the present disclosure are described in detail below in conjunction with the drawings.

To facilitate the sufficient understanding of the disclosure, many details are set forth in the following description. However, the disclosure can be implemented in other manners than those described herein, and similar extensions can be made by those skilled in the art without deviating from the spirit of the present invention. Therefore the present disclosure is not limited to the embodiments disclosed hereinafter.

Conventionally, as descried in the background, after establishing a communication connection with an external device, a mobile terminal has the interface (UI) remaining the same style as the original one when not being connected to the external device; the mobile terminal can not adjust the style of the interface automatically, and therefore the current style (including a color of the interface, a color, shape, size, dynamic state and static state of element(s) on the interface) of the interface (UI) can not be matched with appearance of the external device (mainly a color and a pattern) automatically. Currently, the style of the interface is adjusted only in a way of manually setting the style of the interface. The operation for the user to manually set the interface (UI) is tedious, and experience for the user of the mobile terminal is poor.

In order to solve the technical problems described above, a method for controlling display of an interface in a mobile terminal is provided according the embodiments of the present disclosure. The method for controlling the display of the interface in the mobile terminal according to the embodiment of the present disclosure is described in detail below in conjunction with FIG. 1 to FIG. 3.

First Embodiment

Figure 1:
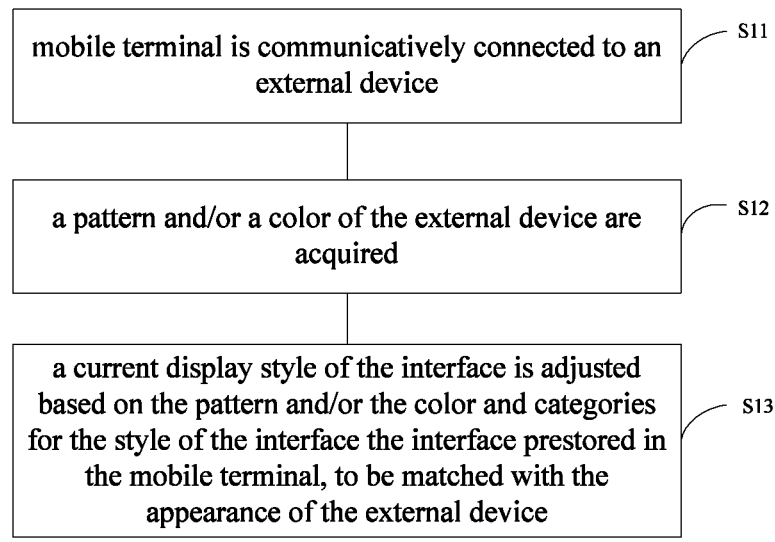
FIG. 1 is a schematic flow diagram of a display control method according to a first embodiment of the present disclosure.

Reference is made to FIG. 1. FIG. 1 is a flow diagram of a method for controlling display of an interface in a mobile terminal according to the first embodiment of the present disclosure. The display control method includes step S11 to step S13.

In S11, the mobile terminal is communicatively connected to an external device.

It should be noted that, the mobile terminal described in the embodiment of the present disclosure includes a terminal having a visible interface, such as a mobile phone or an iPad. The external device includes an external power supply, an external computer or the like. Practically, the external device may also include various accessories of the external device, and the accessories can be communicatively connected to the mobile terminal, i.e., the accessories can perform data transmission with the mobile terminal.

In the embodiment, the mobile terminal is communicatively connected to the external device in advance. The mode of the communication connection between the mobile terminal and the external device is not limited in the present disclosure, and the mode of the communication connection includes a wireless communication connection and a wired communication connection. The wireless communication connection refers to a connection using wireless signals via devices such as Bluetooth or network card. The wired communication connection is implemented via a physical connection between the external device and the mobile terminal, and the physical connection can be realized by a connection port.

In a case that the mobile terminal is a mobile phone and the external device is an external power supply, the communication connection between the mobile terminal and the external power supply can be realized by a charging port, or can be realized by other connection port on the mobile phone, or can be realized by wireless communication.

In S12, a pattern and/or a color of the external device are acquired.

After the mobile terminal is communicatively connected to the external device, data transmission can be performed between the mobile terminal and the external device. The mobile terminal can acquire the pattern and/or the color of the external device through the data transmission.

Specifically, the mobile terminal acquires the pattern and/or the color of the external device by two approaches as follows.

Figure 2:
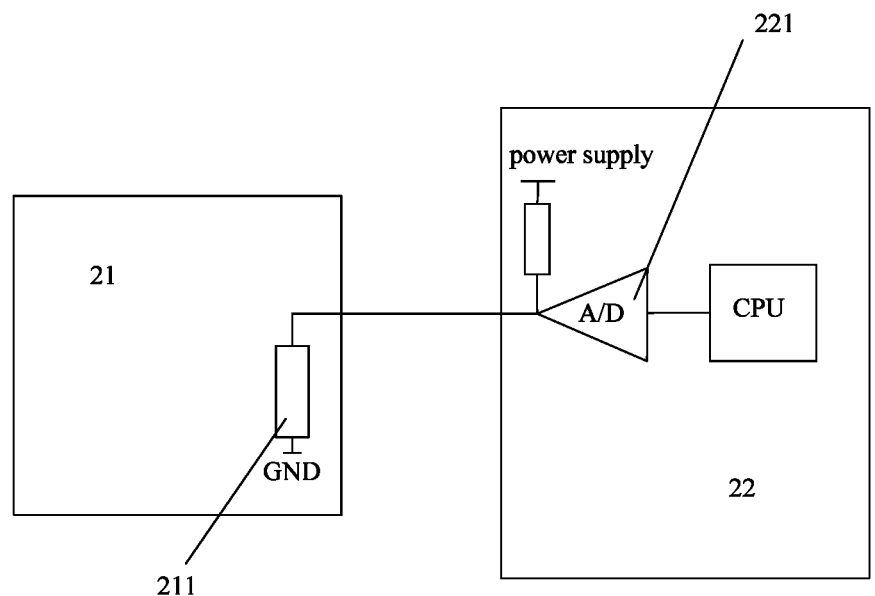
FIG. 2 is a schematic diagram of a first approach for acquiring a pattern and/or a color of an external device according to the first embodiment of the present disclosure.

A first approach:

As shown in FIG. 2, a preset resistor 211 is provided in the external device 21, and a resistance of the preset resistor 211 is preset to correspond to the pattern and/or the color of appearance of the external device 21. The mobile terminal 22 detects the resistance of the preset resistor 211 in the external device 21 by an AD converting circuit 221 in the mobile terminal 22; the mobile terminal 22 can acquire a pattern and/or a color corresponding to the pattern and/or the color of the external device 21 based on the resistance of the resistor 211.

Figure 3:
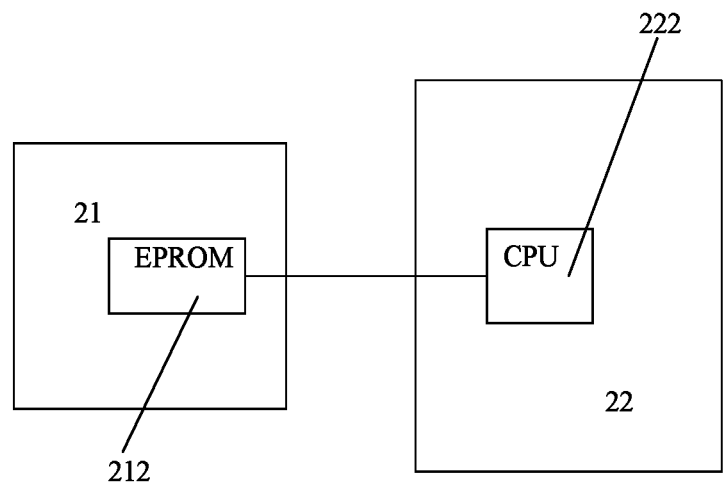
FIG. 3 is a schematic diagram of a second approach for acquiring a pattern and/or a color of an external device according to the first embodiment of the present disclosure.

A second approach:

As shown in FIG. 3, an EPROM 212 is generally provided in the external device 21, and module parameters related to the external device 21 are stored in the EPROM 212. The module parameters include relevant parameters for identifying components and performance of the external device and parameters for identify manufacturer producing the external device. The relevant parameters for identifying the chip components and the performance would include a set of module parameters which are related to the pattern and/or the color of appearance of the external device 21. In a process of packaging the external device 21, the manufacturer packages the EPROM 212, into which the module parameters are written, in the external device 21. After the external device 21 is communicatively connected to the mobile terminal 22, a CPU 222 in the mobile terminal 22 is connected to the EPROM 212 of the external device 21, and the CPU 222 in the mobile terminal 22 reads the module parameters stored in the EPROM 212, which correspond to the pattern and/or the color of the external device 21, and the pattern and/or the color of the external device 21 can be obtained based on the module parameters.

These are two preferable approaches for acquiring the pattern and/or the color of the external device; it is not limited to acquire the pattern and/or the color of the external device by these two approaches, and other approaches can also be used to acquire the pattern and/or the color of the external device.

In S13, a current display style of the interface is adjusted based on the pattern and/or the color and categories for the style of the interface the interface prestored in the mobile terminal, to be matched with the appearance of the external device.

It is well known that, in order that the style of the interface of a user device can meet requirements of different users, multiple categories of style for the interface, such as display mode, color of the interface, and color, shape, size and static or dynamic state of element(s) on the interface, are stored in the mobile terminal. The user can adjust the display style of the interface of the mobile terminal freely based on the multiple prestored categories of style for the interface, to achieve satisfactory display style of the interface or make the display style of the interface conformal or harmonious with the appearance of the mobile terminal as a whole.

In order to match the display style of the interface of the mobile terminal with the appearance of the external device, the mobile terminal in the embodiment of the present disclosure can automatically adjust the current display style of the interface based on the acquired pattern and/or the acquired color of the external device and the categories of the style for the interface prestored in the mobile terminal, whereby the adjusted style of the interface matches with the appearance of the external device without manually setting the style of the interface by the user. More specifically, the adjusted style of the interface matches with the pattern and/or color of the external device in a conformal or harmonious manner. The so called matching refers to the case that the style of the interface is harmonious and conformal with the appearance of the external device to achieve overall aesthetics.

In the embodiment, for the adjustment of the display style of the interface, it is feasible to only adjust the display color, or only adjust the element(s) on the interface, or adjust both the display color and the element(s) on the interface. The display color can be adjusted according to the color of the external device, so as to adapt the display style of the interface to a whole hardware assembly composing of the mobile terminal and the external device, to achieve a relatively harmonious and aesthetic appearance. The adjustment to the format of the element(s) within the interface may involve adjustment to color, shape, size, static state and dynamic state of icon(s) of the element(s).

In the method for controlling display of interface in the mobile terminal according to the first embodiment, the mobile terminal can automatically adjust the display style of the interface after acquiring the pattern and/or the color of the external device, to be conformal with the pattern and/or the color of the external device, thereby avoiding a step of manually setting the current display style of the interface, simplifying the operation and improving the user experience.

In another embodiment of the present disclosure, the external device may be an external power supply for the mobile terminal. At present, the external power supply is generally a large capacity battery which can avoid the problem of disrupting the mobile terminal from normal operation due to low battery. However, in a case that the external power supply is combined with the mobile terminal together, the overall appearance of the mobile terminal is changed. For overall aesthetic and harmoniousness of the mobile terminal, the external power supply is generally attached to a side of the mobile terminal back to the interface. Furthermore, the external power supply can be attached to a back side of the mobile terminal in a back-hanging manner or a magnetic-attaching manner, normally by making the appearance of the external power supply as a protective case for the mobile terminal or by sticking with magnet. In order to further improve overall conformity between the interface and the whole assembly formed by the mobile terminal and the external power supply, the display style of the interface can be adjusted to be conformal with the whole assembly formed by the mobile terminal and the external power supply.

In a case that the appearance of the external power supply is made as the protective case for the mobile terminal, the housing of the hardware assembly formed by the mobile terminal and the external power supply is mostly formed by the housing of the external power supply. After acquiring the color and/or the pattern of the external power supply, the mobile terminal adjusts the display style of the interface to be matched with the appearance of the external power supply. Since the housing of the hardware assembly formed by the mobile terminal and the external power supply is mostly formed by the housing of the external power supply, the display style of the interface matching with the appearance of the external power supply almost matches with appearance of the hardware assembly.

Based on the method for controlling display of the interface of the mobile terminal according to the first embodiment, the embodiments of the present disclosure further provide an apparatus for controlling display of an interface of a mobile terminal. Reference is made to an second embodiment.

Second Embodiment

Figure 4:
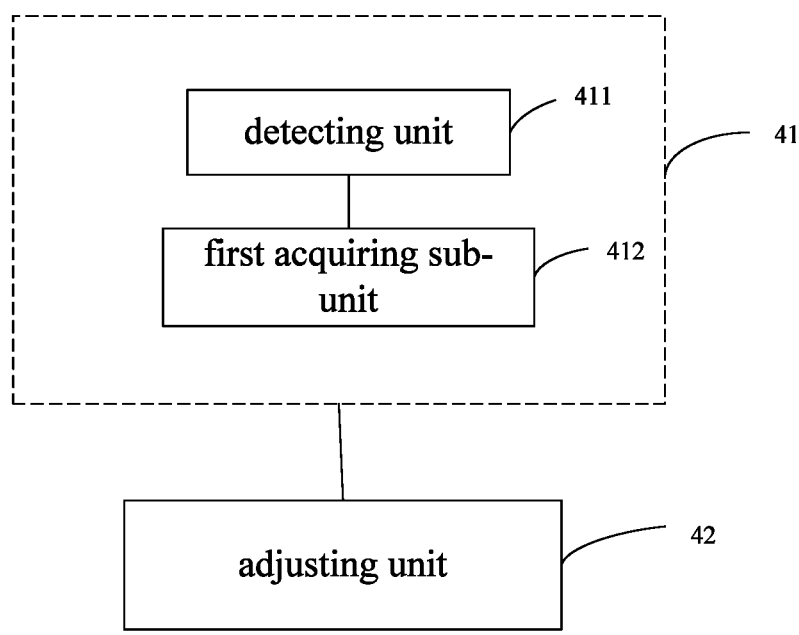
FIG. 4 is a schematic structural diagram of a display control apparatus according to a second embodiment of the present disclosure.

Referring to FIG. 4, an apparatus for controlling display of an interface in a mobile terminal is provided in the embodiment of the present disclosure. The mobile terminal described in the embodiment is communicatively connected to an external device in advance. The apparatus includes an acquiring unit 41 and an adjusting unit 42. The acquiring unit 41 is configured to acquire a pattern and/or a color of the external device.

As an embodiment of the apparatus, a preset resistor is provided in the external device, a resistance of the preset resistor corresponds to the pattern and/or the color of the external device. The acquiring unit 41 may include:

a detecting unit 411 configured to detect the resistance of the preset resistor in the external device; and a first acquiring sub-unit 412 configured to acquire a pattern and/or a color corresponding to the pattern and/or the color of the external device based on the resistance of the preset resistor.

The adjusting unit 42 is configured to adjust a current display style of the interface based on the pattern and/or the color and categories for the style of the interface the interface prestored in the mobile terminal, to be matched with the pattern and/or the color of the external device.

Figure 5:
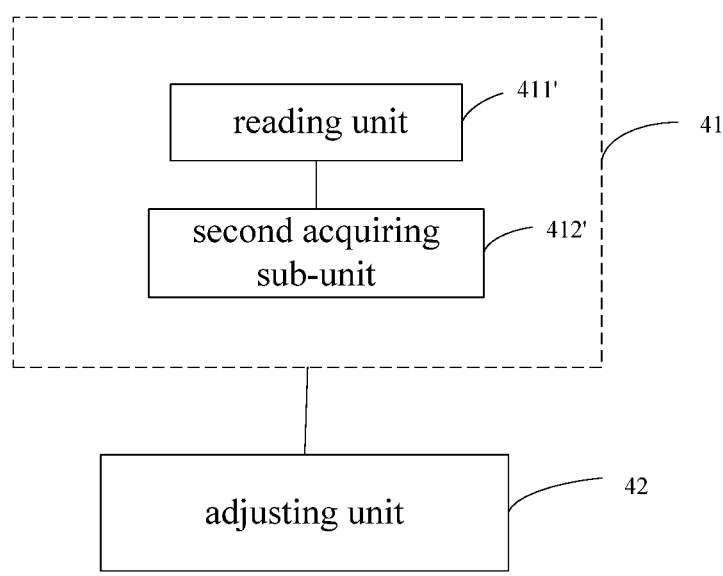
FIG. 5 is another schematic structural diagram of a display control apparatus according to the second embodiment of the present disclosure.

As another embodiment of the display control apparatus according to the present disclosure, module parameters related to the pattern and/or the color of the external device are stored in the external device. Reference is made to FIG. 5. FIG. 5 is another schematic structural diagram of the display control apparatus, the acquiring unit 41 includes:

a reading unit 411' configured to read the module parameters related to the pattern and/or the color of the external device; and a second acquiring sub-unit 412' configured to acquire the pattern and/or the color of the external device based on the module parameters related to the pattern and/or the color of the external device It should be noted that, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

Since the device embodiment and the system embodiment correspond to the method embodiment, for relevant parts one can refer to the description of the method embodiment. The device embodiment described above is only exemplary, in which the units described as separate components may be or not be separated physically, components shown as units may be or not be physical units, i.e., the components may be located at one place or distributed as multiple network units. Some or all of the modules may be selected to implement the objective of the solution of the embodiments as required. Those skilled in the art can understand and practice the disclosure without any creative works.

The method and apparatus for controlling display of the interface in the mobile terminal according to the present disclosure are introduced in detail above. Specific examples are set forth to specify the principle and implementation of the disclosure, and the description of the foregoing embodiments is only intended to facilitate understanding the method and core principle of the disclosure. In addition, various modifications to implementations and applications of the embodiments may be made by those skilled in the art based on the spirit of the disclosure. Therefore, the disclosure is not meant to be limited to the specification.

The invention claimed is:

1. A method for controlling display of an interface in a mobile terminal, wherein the mobile terminal is communicatively connected to an external device, the method comprises:

acquiring a pattern of an appearance of the external device and/or a color of an appearance of the external device; and adjusting a current display style of the interface based on the pattern of the appearance of the external device and/or the color of the appearance of the external device, as well as categories for the style of the interface which are prestored in the mobile terminal, to be matched with the pattern of the appearance of the external device and/or the color of the appearance of the external device, wherein the external device is attachable to the mobile terminal to form a hardware assembly, and a housing of the hardware assembly is at least partially formed by a housing of the external device, wherein the adjusted display style of the interface is matched with an appearance of the housing of the hardware assembly, wherein the housing of the external device is formed as a protective case for the mobile terminal, and wherein the external device is provided with a preset resistor, and a resistance of the preset resistor corresponds to the pattern of the appearance of the external device and/or the color of the appearance of the external device, the acquiring the pattern of the appearance of the external device and/or the color of the appearance of the external device comprises:

detecting the resistance of the preset resistor in the external device; and acquiring the pattern of the appearance of the external device and/or the color of the appearance of the external device based on the resistance of the preset resistor.

2. The method according to claim 1, wherein the external device stores module parameters related to the pattern of the appearance of the external device and/or the color of the appearance of the external device, the acquiring the pattern of the appearance of the external device and/or the color of the appearance of the external device comprises:

reading the module parameters related to the pattern of the appearance of the external device and/or the color of the appearance of the external device; and acquiring the pattern of the appearance of the external device and/or the color of the appearance of the external device based on the module parameters related to the pattern of the appearance of the external device and/or the color of the appearance of the external device.

3. The method according to claim 1, wherein the external device is an external power supply attached to a side of the mobile terminal back to the interface.

4. The method according to claim 1, wherein a communication connection between the mobile terminal and the external device comprises a wireless communication connection or a wired communication connection.

5. The method according to claim 1, wherein the style of the interface comprises a color of the interface and/or a format of an icon for an element within the interface.

6. The method according to claim 5, wherein the format of the icon for the element within the interface comprises a color, a shape, a size, a static state and/or a dynamic state of the icon.

7. A mobile terminal, comprising:

a processor; and a memory storing instructions, which, when executed by the processor, cause the processor to:

acquire a pattern of an appearance of an external device and/or a color of an appearance of an external device that the mobile terminal is communicatively connected to; and adjust a current display style of an interface in the mobile terminal based on the pattern of the appearance of the and/or the color of the appearance of the external device, as well as categories for the style of the interface which are prestored in the mobile terminal, to be matched with the pattern of the appearance of the external device and/or the color of the appearance of the external device, wherein the external device is attachable to the mobile terminal to form a hardware assembly, and a housing of the hardware assembly is at least partially formed by a housing of the external device, wherein the adjusted display style of the interface is matched with an appearance of the housing of the hardware assembly, wherein the housing of the external device is formed as a protective case for the mobile terminal, and wherein the external device is provided with a preset resistor, and a resistance of the preset resistor corresponds to the pattern of the appearance of the external device and/or the color of the appearance of the external device, and wherein the memory further stores instructions, which, when executed by the processor, cause the processor to:

detect the resistance of the preset resistor in the external device; and acquire the pattern of the appearance of the external device and/or the color of the appearance of the external device based on the resistance of the preset resistor.

8. The mobile terminal according to claim 7, wherein the external device stores module parameters related to the pattern of the appearance of the external device and/or the color of the appearance of the external device, and wherein the memory further stores instructions, which, when executed by the processor, cause the processor to:

read the module parameters related to the pattern of the appearance of the external device and/or the color of the appearance of the external device; and acquire the pattern of the appearance of the external device and/or the color of the appearance of the external device based on the module parameters related to the pattern of the appearance of the external device and/or the color of the appearance of the external device.

* * * * *